United States Patent
Shelnutt et al.

[19]

[11] Patent Number: 6,117,369
[45] Date of Patent: Sep. 12, 2000

[54] NICKEL PORPHYRINS FOR MEMORY OPTICAL APPLICATIONS

[75] Inventors: John A. Shelnutt, Tijeras; Songling Jia, Albuquerque, both of N. Mex.; Craig Medforth, Vacaville, Calif.; Dewey Holten, St. Louis, Mo.; Nora Y. Nelson, Manteca; Kevin M. Smith, Davis, both of Calif.

[73] Assignee: Sandia Corporation

[21] Appl. No.: 09/067,408

[22] Filed: Apr. 28, 1998

[51] Int. Cl.[7] ............................... F21V 9/00; F21V 9/04; G02B 5/23; C07B 47/00
[52] U.S. Cl. .......................... 252/582; 252/586; 252/587; 252/589; 540/145
[58] Field of Search ........................ 540/145; 252/582, 252/586, 587, 589

[56] References Cited

U.S. PATENT DOCUMENTS

| | | | |
|---|---|---|---|
| 3,687,863 | 8/1972 | Wacher | 540/145 |
| 4,885,114 | 12/1989 | Gordon et al. | 540/145 |
| 5,011,756 | 4/1991 | Nikles | 430/19 |
| 5,252,698 | 10/1993 | Bhardwaj et al. | 528/230 |
| 5,424,305 | 6/1995 | Skalkos et al. | 514/185 |
| 5,424,974 | 6/1995 | Liu et al. | 365/112 |
| 5,438,051 | 8/1995 | Morgan et al. | 514/185 |
| 5,663,328 | 9/1997 | Ellis, Jr. et al. | 540/145 |

OTHER PUBLICATIONS

Drain, C., Gentemann, S., Roberts, J., Nelson, N., Medforth, C., Jia, S., Simpson, M., Smith, K., Fajer, J., Shelnutt, J., and Holten, D., "Picosecond to Microsecond Photdynamics of a Nonplanar nickel Porphyrin: Solvent Dielectric and Temperature Effects", Am. Chem. Soc., 1998, 120, 3781–3791.

Song, X., Jentzen, W., Jia, S., Jaquinod, L., Nurco, D., Medforth, C., Smith, K., and Shelnutt, J., "Representation of Nonplanar Structures of Nickel(II) 5,15–Disubstituted Porphyrins in Terms of Displacements along the Lowest–Frequency Normal Coordinates of the Macrorcycle," J. Am. Chem. Soc., 1996, 118(51), 12975–12988.

Goll, J., Moore, K., Ghosh, A., Therien, M., "Synthesis, Structure, Electronic Spectroscopy, Photophysics, Electrochemistry, and X–ray Photoelectron Spectroscopy of Highly–Electron–Deficient [5,10,15,20–Tetrakis(perfluoroalkyl)porphinato]zinc(II) Complexes and Their Free Base Derivatives," J. Am. Chem. Soc. 1996, 118, 8344–8354.

*Primary Examiner*—Philip Tucker

[57] ABSTRACT

The present invention relates to a nickel-porphyrin derivative in a matrix, the nickel-porphyrin derivative comprising at least two conformational isomers, a lower-energy-state conformer and a higher-energy-state conformer, such that when the higher-energy-state conformer is generated from the lower-energy-state conformer following absorption of a photon of suitable energy, the time to return to the lower-energy-state conformer is greater than 40 nanoseconds at approximately room temperature. The nickel-porphyrin derivative is useful in optical memory applications.

8 Claims, 3 Drawing Sheets

(a)

(a)

(b)

NICKEL PORPHYRINS FOR MEMORY OPTICAL APPLICATIONS

This invention was made with Government support under Contract No. DE-AC04-94AL85000 awarded by the Department of Energy. The Government has certain rights in the invention.

BACKGROUND OF THE INVENTION

The present invention relates to porphyrin-based materials and more particularly to nickel-porphyrin materials that exhibit fast switching times and long data-retention times.

Porphyrins are a cyclic tetrapyrrolic system consisting of a 20-carbon skeleton and have been used in a variety of electrical, optical, structural, and catalytic applications. Metal ions can covalently bond within the porphyrin structure. Various peripheral groups, both inorganic and organic, are attached to the 20-carbon skeleton to provide desired physical, chemical, and optical characteristics.

Bhardwaj et al., in U.S. Pat. No. 5,252,698 issued on Oct. 12, 1993, and U.S. Pat. No. 5,312,896 issued on May 17, 1994, describe metal-ion porphyrin-containing poly(imide). The taught polymers are useful as electrical conductors and as liquid crystal polymers.

Skalkos et al., in U.S. Pat. No. 5,424,305 issued on Jun. 13, 1995, describe purified imines of porphyrins for use in retarding growth of cancer tumors.

Morgan et al, in U.S. Pat. No. 5,438,051, disclose a family of porphyrin derivatives and metal complexes thereof having bivalent aliphatic hydrocarbon radical groups attached that are useful in detecting or treating tumors in humans or animals.

Nikies, in U.S. Pat. No. 5,011,756, issued on Apr. 30, 1991, describe a method of writing and reading optical information by using a photochiroptical effect which allows light to distinguish between two optical conformers. Circular polarized light is used to selectively photolyze one of two optical conformers to write or read information.

Liu et al., in U.S. Pat. No. 5,424,974, issued on Jun. 13, 1995, describe the use of porphyrins in writing and reading optical information using a radiation pulse and controlling the charge across the porphyrin film. An important part of the taught invention is that no structural transition is involved.

Drain et al. (Drain, C., Gentemann, S., Roberts, J., Nelson, N., Medforth, C., Jia, S., Simpson, M., Smith, K., Fajer, J., Shelnutt, J., and Holten, D., J. Am. Chem. Soc., in press) describe nickel porphyrin materials, predicted by molecular modeling calculations and subsequently synthesized, that have two stable conformational isomers with lifetimes that can be useful in optical memory applications. Drain et al. show that temperature and the matrix in which the porphyrin is placed affect the lifetime of the conformations.

Useful would be a material, such as a nickel porphyrin, that can be used in optical memory applications by controllably switching the material from one energy state to another.

SUMMARY OF THE INVENTION

The present invention comprises a nickel-porphyrin derivative in a matrix, the nickel-porphyrin derivative comprising at least two conformational isomers, a lower-energy-state conformer and a higher-energy-state conformer, such that when the higher-energy-state conformer is generated from the lower-energy-state conformer following absorption of a photon of suitable energy, the time to return to the lower-energy-state conformer is greater than 40 nanoseconds at approximately room temperature.

The matrix can be a polymer, gel, or solvent.

Solvents may be polar or non-polar and include benzene, toluene, methylcyclohexane, cyclohexane, mineral oil, 2,2,5,5-tetramethyltetrahydrofuran, o-dichlorobenzene, 2,6-dimethylpyridine, chlorobenzene, quinoline, nitrobenzene, 2-nitrotoluene, benzonitrile, dimethylformamide, dimethylsulfoxide, nitromethane, 2-methylpyridine, 2,5-dimethylpyrrolidine, piperidine, aniline, pyridine, pyrrolidine, 2,5-dimethyltetrahydrofuran, methyl(t-butyl) ether, anisole, 3-pentanone, 2-methyltetrahydrofuran, cyclohexanone, tetrahydrofuran, diethylether, 3-methylpentane, methylcyclopentane, and 1,4-dioxane.

The invention is also a nickel-porphyrin derivative in a matrix which is predicted by molecular modeling calculations to have at least two conformational isomers, a lower-energy-state conformer and a higher-energy-state conformer, such that when the higher-energy-state conformer is generated from the lower-energy-state conformer following absorption of a photon of suitable energy, the time to return to the lower-energy-state conformer is greater than 40 nanoseconds at approximately room temperature.

BRIEF DESCRIPTIONS OF THE DRAWINGS

DETAILED DESCRIPTION OF THE INVENTION

Figure 1:
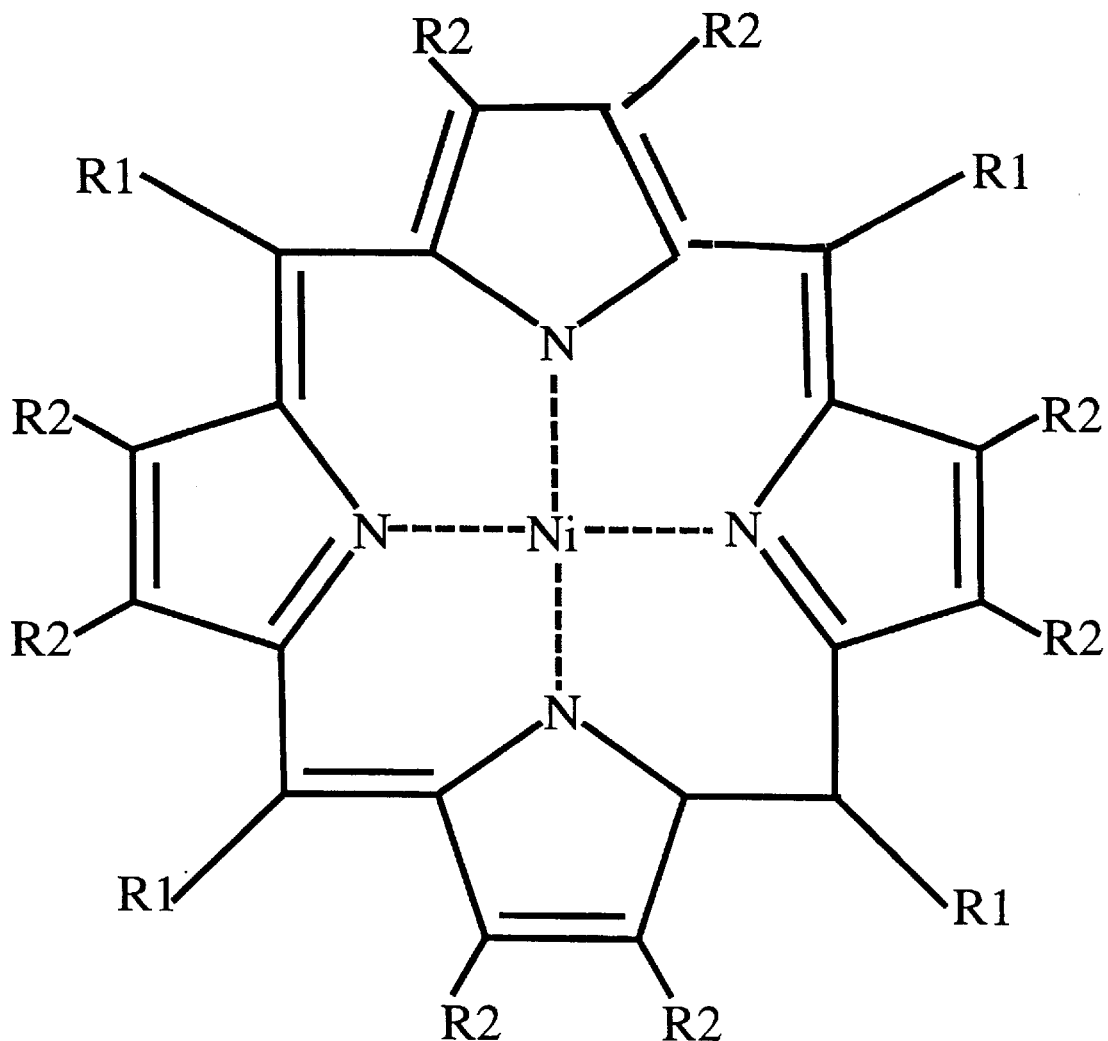
FIG. 1 shows the structure of a general nickel-porphyrin derivative.

The present invention is a new type of optical, molecular switch material for optical memory applications. These materials are biophotonic materials and, more particularly, are specially designed and synthesized nickel-porphyrin derivatives that have unique photophysical and optoelectronic properties. The general structure of these nickel-porphyrin derivatives, a class of macrocyclic tetrapyrrole ligands, is shown in FIG. 1. The nickel atom is covalently bonded in the structure of the porphyrin. These nickel-porphyrin derivatives have peripheral substituents R1 and R2, where R1 and R2 are any groups that allow the nickel-porphyrin derivative to exist as at least two conformational conformers and more particularly, that allow the nickel-porphyrin derivative to exist in a highly ruffled (or ground) state. Generally, R1 will be a single atom or a group that can be tetrahedrally bonded. The group R2 can potentially be any group. The optical properties of the nickel porphyrins of the present invention permit ultrahigh storage densities (>1 gigabyte/cm$^2$) and ultrafast (approximately 1 picosecond) switching times. Possible applications include optical limiting, Q-switching, cavity dumping, mode locking, chemical sensors, displays, verification, encryption and nanocomputing.

These new materials rely on a novel kinetic conformation-trapping mechanism. For molecular-scale optical memory device applications, the optical material must possess distinct 'on' and 'off' states and must possess states that can be set and read. The present invention teaches porphyrin derivatives that meet these requirements for suitable optical memory device applications. In particular, certain nickel-containing porphyrins have been shown to have at least two conformational isomers with the capable of switching between the two conformers to provide the necessary photophysical properties. By exploiting the conformation-trapping mechanism, materials can be tailored for specific applications using computer-guided synthesis methods. For optical memory device applications, the porphyrin derivatives must be placed in a structural matrix such as a polymer or gel. For other applications, such as chemical sensors, the porphyrin derivatives might be placed in a structural matrix as a solvent, polymer or gel.

Figure 2:
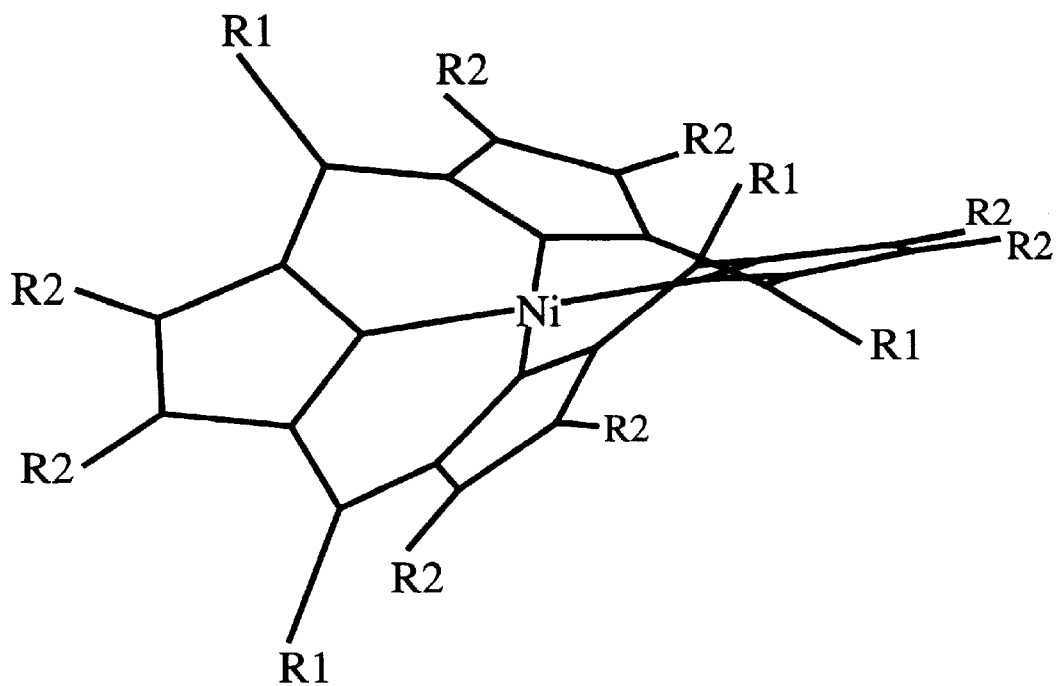
FIG. 2 depicts a) a nickel-porphyrin derivative in its lower-energy, or ruf, state, and b) a nickel-porphyrin derivative in its higher-energy, or dom, state.
Figure 2:
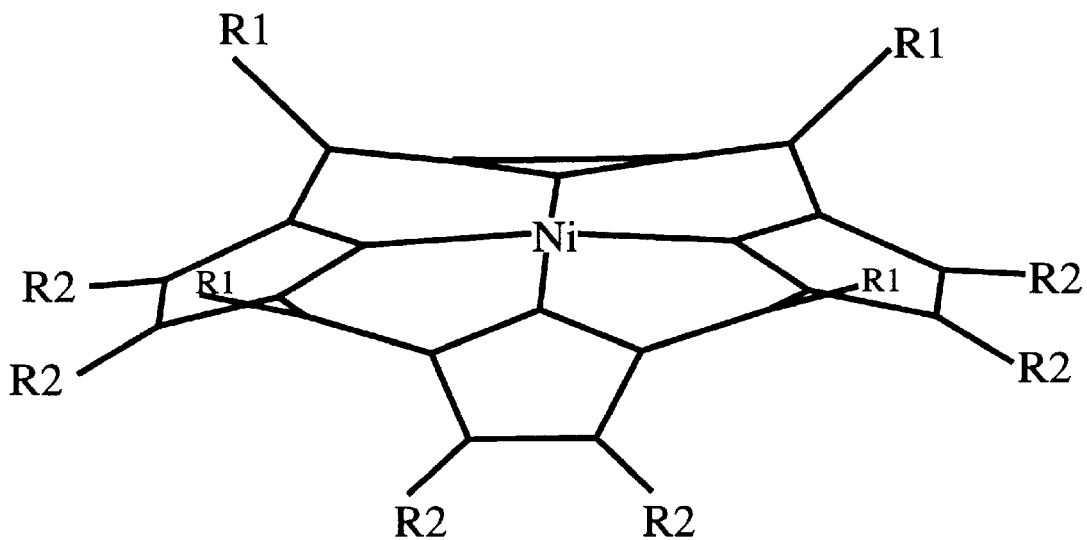

Because not every nickel-porphyrin derivative possesses the necessary two conformations, molecular mechanics calculations were used to predict porphyrin structures and energies. Calculations have predicted nickel-based, symmetric porphyrins that exhibit a ruffled (nonplanar) ground state conformation and also a higher-energy-state conformation (e.g., a domed conformation or a mixed ruffled-domed-wave conformation) wherein an energy barrier exists between the two different conformations. The capability to have different stable conformations provides the 'on' and 'off' states necessary for the material to function in optical memory device applications. An energy barrier between the two conformations is required to control thermal switching between the two states or conformers. The characteristics of the energy barrier determine the lifetime of one conformational conformer before the conformer reverts to its alternate conformational conformer. When photon-induced conformational changes occur in the porphyrin conformer in its ruffled (ruf) state (see FIG. 2a), molecular and electronic asymmetry result to form a conformer in a polar excited state (such as the domed, or dom, conformation, see FIG. 2b). This asymmetry is imposed by the steric constraints of the porphyrin peripheral substituents, R1 and R2. Solvent dielectric properties and temperature modulate these conformational excursions and thus the electronic deactivation rates by affecting the excited-state energies, porphyrin/solvent reorganizations, and the populations of low-frequency out-of-plane vibrations.

In the nickel porphyrin derivatives of the present invention, crossing the energy barrier from one conformation state to another results from the rapid (less than 1 ps), large increase in the size of the nickel ion resulting from the change in d-electron configuration. The small nickel ion favors the ruf conformation and a Ni—N distance of 1.85 angstroms, while the large nickel ion in the (d,d) excited state favors the dom conformation and a Ni—N distance of 2.07 angstroms. When the nickel ion in the nickel-porphyrin derivative receives a photon, the size of the nickel ion rapidly changes which causes a change in conformation of the porphyrin derivative. Any metal atom that changes size when receiving a photon can be used in the porphyrin materials to provide a composition useful for optical memory applications. The nonplanar character of the porphyrin molecular structure is an important part of the capability for the porphyrin to possess switchable conformations. This nonplanar character is determined, in part, by the crowding of peripheral substituents R1 and R2. The porphyrin molecule, while trapped in the dom conformation, can be optically switched back to the ground state by absorption of another photon, resulting in a π–π* transition decay back to the $d_{z^2}$ nickel configuration and conversion back to the ruf conformation. Thus, the porphyrin in either state is optically switched to the other by using a write beam of appropriate color and intensity. The memory state of a pixel is read by measuring its absorbance using low-intensity illumination.

An important part of the nickel-porphyrin derivatives of the present invention is the substantial steric crowding of peripheral substituents. These steric constraints limit the ability of the porphyrin derivatives of the present invention in its highly ruffled state to increase its Ni—N distance to accept the large nickel ion in the ($d_{x^2-y^2}$, $d_{z^2}$) configuration generated upon photoexcitation. One important way for the nickel-nitrogen electron repulsion in the ligand-field excited state to be relieved is for the electronically-excited nickel-porphyrin derivative to change to a different stable conformer (such as the dome or mixed structure conformers) with a less pronounced preference for a short metal-nitrogen distance. A consequence of this constrained structure and the limited ways that the nickel-nitrogen electron repulsion can be relieved is that the excited state derivative of the nickel porphyrin is significantly slower than in nominally planar porphyrins, such as Ni- tetraphenylporphyrin. This results in a longer lifetime for the excited state of the Ni-based porphyrins of the present invention.

Further, the results from time-resolved absorption spectroscopy of nickel-porphyrins of the present invention show a blue shift of the absorption band for the excited state relative to the ground state. For nickel porphyrins without at least two stable conformations, however, a red-shift is observed because a conformational change does not occur. These conventional Ni porphyrins do not have a significantly high energy barrier that hinders this conformational change and consequently they return to the ground state in less than 0.5 ns, which is a retention time that is too short to make them useful for memory applications. In contrast, as discussed below, nickel-porphyrin derivatives of the present invention recover the ruf ground state in much longer times.

The molecular mechanics calculations used in predicting porphyrin structures, energies and properties were performed using modified POLYGRAF software (Version 3.21, Molecular Simulations, Inc., San Diego, Calif.). The software calculations used a force field model developed by Song et al. (Song, X., Jentzen, W., Jia, S., Jaquinod, L., Nurco, D., Medforth, C., Smith, K., and Shelnutt, J.; Journal of the Amer. Chem. Soc., 1996, 118(51), 12975–12988) (incorporated herein by reference). This force field model used atom types specific to the porphyrin macrocycle and force constants from normal coordinate analyses of nickel porphyrins. Bond lengths and angles were determined by validating model predictions with known nickel-porphyrin structures.

Calculations for one compound, nickel(II) tetra(tert-butyl) porphyrin (NiTtBuP), show that an energy barrier exists between two different conformations of the molecule. The molecular structures of NiTtBuP are shown in both its 'on' and 'off', or lower energy and higher energy, states in FIGS. 2a and 2b, respectively. In this nickel porphyrin, R1 is the tert-butyl group and R2 is hydrogen. These structures have been predicted by molecular mechanics calculations, chemically synthesized, and verified by chemical diagnostic techniques. Absorption of visible photons by the ruf lower energy, or ground, state of NiTtBuP ($d^2_{z^2}$) is followed by decay (30 ps) to a low lying, high-spin, d–d* excited, or higher energy, state configuration ($d_{x^2-y^2}$, $d_{z^2}$). In the dom structure, the high-spin state is the lowest-energy electronic state and is stable if the conformational energy barrier to conversion back for the ruf $d^2_{z^2}$ is high enough. The steric characteristics of the peripheral groups R1 and R2 cause this barrier and give NiTtBuP the optoelectronic and photophysical properties that are different from other Ni porphyrins without such as energy barrier. Tests have demonstrated that the ruf conformer can be controllably switched to the dom conformer by applying a blue light and then switched back to the ruf conformer by applying a green light. The state of the conformation can be read by measuring its absorbance using low-intensity illumination.

Another synthesized compound predicted to have improved photophysical properties is Ni tetra(adamantyl) porphyrin (NiTAdP). This porphyrin is more sterically constrained than NiTtBuP. Results from time-resolved absorption spectroscopy showed that the lifetime of the trapped conformer of this porphyrin increased from 40 to 50 ns, compared with NiTtBuP.

Another compound, Ni(II) meso-tetraisopropylporphyrin was also simulated and synthesized. Demonstrating the validity of the prediction methods used, molecular mechanics calculations predicted no significant energy barrier between conformations and subsequent time-resolved absorption spectroscopy measurements show the lifetime for NiTiPrP is just 100 ps, which is the same order as planar porphyrins that possess no transition barrier due to the absence of a conformational change between stable conformers. The experimental results confirmed the computational predictions that this nickel-containing porphyrin did not have suitable optoelectric properties of memory applications.

Classical molecular simulations suggested that much longer lifetimes can be obtained by haloginating NiTtBuP; i.e., using halogen atoms for the R2 compounds. The calculations predict a lifetime of days at room temperature. The electron-withdrawing halogen substituents, such as chlorine, fluorine, bromine, and iodine, increase the affinity of Ni for axial ligands. Axial ligand binding in the excited state increases the lifetime, as a result of an additional barrier that prevents ligand release. This barrier and the conformational one act together to increase the retention time. The affinity for axial ligands drastically increases in the excited state because of the half empty axial $d_{z^2}$ orbital. Thus, the concentration of potential ligands can be tuned so that ligation only occurs in the excited state. Ligation also has a favorable effect on the energies of the metastable conformers, making the conformational barriers effectively higher. The barrier to interconversion between conformers for brominated NiTt-BuP has been calculated to be ten times larger than for the unbrominated NiTtBuP, indicative of a memory retention time of several days or more.

Although pure brominated NiTtBuP (NiBr$_8$TtBuP) has not been successfully synthesized, an analog, a mixture of octahalogenated NiTtBuP species (NiBr$_6$Cl$_2$TtBuP), was evaluated by resonance Raman spectroscopy which showed that axial ligation occurred in the excited state upon laser excitation. Specifically, in solution in 10% pyridine in benzene, absorption spectra showed negligible axial coordination of pyridine. Upon CW laser irradiation, the Raman spectrum obtained was the same as that obtained in neat pyridine. The absorption spectrum showed almost complete formation of the axially coordinated pyridine complex. The excited state coordination occurring in the laser beam indicates that the lifetime of the excited state would be somewhere in the millisecond-to-hours time regime. In one hour after laser irradiation, the absorption spectrum had not completely converted back to the ground state spectrum.

Another compound, NiBr$_8$T(CF$_3$)P [Ni(II) octabromo tetra(trifluoromethyl)porphyrin] has been synthesized, as verified by X-ray crystallography and $^{19}$F-NMR. In the synthesis, free-base H2T(CF3)P was prepared using a literature procedure (Goll, J. C.; Moore, K. T.; Ghosh, A.; Therien, M. J., J. Am. Chem. Soc. 1996, 118, 8344–8354; herein incorporated by reference) and Ni inserted into the porphyrin ring by standard methods. The NiT(CF$_3$)P was then exhaustively brominated by refluxing in chloroform containing a large excess of Br$_2$ to form the NiBr$_8$(CF$_3$)P. This compound is an analog to brominated NiTtBuP, with the R1 compound being the trifluormethyl group and the R2 group being bromine. When placed in neat 2-hexanol, the porphyrin slowly converts to the 6-coordinate axial ligated form. Specifically, white light results in a steady-state population of the two forms. Steady-state concentrations of the two forms occur in white light because the two forms are equally activated by light at their respective absorption bands. In contrast, conversion almost entirely to the 6-coordinate form occurs in the dark. Measurement of the rate of conversion to the 6-coordinate form gives an estimate of the free energy barrier between the two conformations of >20 kcal/mol and a lifetime of 30 minutes. Lifetimes greater than $10^{12}$ years are predicted at 77 K using the Arrhenius exponential relationship shown to be operative for these nickel-porphyrin derivatives. Calculations also show that the lifetime can be varied over several orders of magnitude by varying the polarity of the molecular environment (the solvent) and that increases in memory retention times occur in viscous environments, such as in polymeric environments.

Another consequence of the combined structural and electronic factors operative in the nickel-porphyrin derivatives of the present invention is that the photoexcited porphyrin molecule is polar, with a corresponding sensitivity of the excited-state deactivation rate on the dielectric properties of the solvent in which the porphyrin is placed. The effects of the solvent diminish as the temperature is lowered and similar effects from both polar and nonpolar media have been observed near 80° K.

TABLE 1 shows results that demonstrate the solvent effects on the lifetime of the excited state of the Ni-based porphyrin derivative. Nonpolar and polar solvents were studied for the Ni-based porphyrin derivatives. In weakly ligating solvents, such as benzene, toluene, methylcyclohexane, mineral oil, and 2,2,5,5-tetramethyl tetrahydrofuran, NiTtBuP has lifetimes of approximately 30 nanoseconds or more. In none of the more strongly ligating solvents does NiTtBuP have a lifetime greater than one nanosecond.

TABLE 1

Effect of Solvent on Lifetime of Ni Porphyrins at Room Temperature

| Solvent (weakly ligating) | Lifetime (ns) | Solvent (strongly ligating) | Lifetime (ns) |
|---|---|---|---|
| NiTtBuP | | | |
| Benzene | 46 | 2-methylpyridine | 0.14 |
| Toluene | 29 | 2,5-dimethylpyrrolidine | 0.10 |
| Cyclohexane | 31 | Piperidine | 0.08 |
| Mineral Oil | 30 | Aniline | 0.05 |
| 2,2,5,5-tetramethyl THF | 1.3 | Pyridine | 0.03 |
| o-dichlorobenzene | 0.56 | Pyrrolidine | 0.03 |
| 2,6-dimethylpyridine | 0.54 | Tetrahydrofuran (THF) | 0.03 |
| 2,2,6,6-tetramethyl piperidine | 0.54 | 2,5-dimethyl THF | 0.13ns |
| Chlorobenzene | 0.38 | Methyl(t-butyl) ether | 0.11ns |
| Quinoline | 0.32 | Anisole | 0.10ns |
| 2-nitrotoluene | 0.11 | 3-pentanone | 0.07 |
| Benzonitrile | 0.08 | 2-methyl THF | 0.05 |
| Dimethylformamide | 0.02 | Cyclohexanone | 0.04 |

TABLE 1-continued

Effect of Solvent on Lifetime of Ni Porphyrins at Room Temperature

| Solvent (weakly ligating) | Lifetime (ns) | Solvent (strongly ligating) | Lifetime (ns) |
|---|---|---|---|
| Dimethylsulfoxide | 0.02 | Diethylether | 0.02 |
| Nitromethane | 0.0 | 1,4-dioxane | 0.01 |

Solvent polarity can have a significant effect on lifetime of the excited state of a nickel porphyrin. For example, the lifetime of the excited state of NiTtBuP decreases by a factor greater than $10^4$ when the porphyrin derivative is put in very polar nitromethane as compared with the nonpolar benzene solvent. It is noteworthy that, in each solvent, the decay of the excited state is well described by single-exponential kinetics. This behavior is consistent with the decay of a single excited state in each solvent.

These data have shown that the lifetime of the excited state of the Ni-based porphyrin derivatives can be controlled by the solvent in which the porphyrin is placed. Results have shown that, in general, more viscous solvents yield longer lifetimes for the nickel porphyrin derivatives. The nickel porphyrins have also been placed in other matrix structures. Both polymers and gels can be suitable matrix structures. NiTtBuP has been successfully placed in a polystyrene polymer; other polymers that are not optically reactive can also be used. Gels such as silica gels should also be operative.

Figure 3:
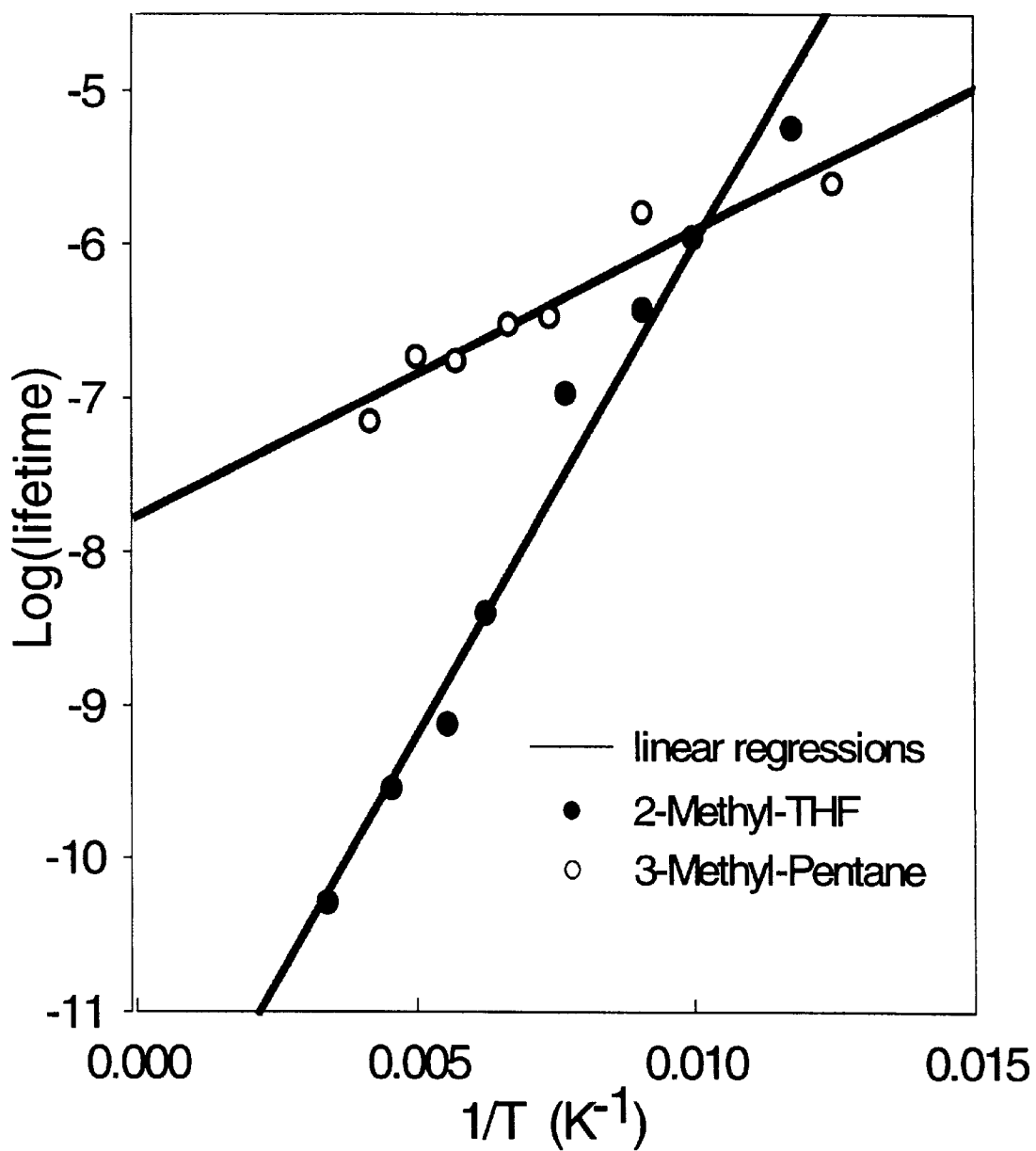
FIG. 3 shows the effect of temperature on the lifetime of NiTtBuP.

Temperature also affects the lifetime of the excited state of the metal-based porphyrins of the present invention according to the Arrhenius exponential relationship. For example, at low temperature (77° K.), the time for NiTtBuP to recover the ruf ground state extends out to 6 microseconds, a value suitable for dynamic optical storage and other applications. Calculations show that this time period can be extended with other designed porphyrins and that the porphyrins can in fact be designed to have specific lifetimes. FIG. 3 shows the effect of temperature on the lifetime of the excited state of NiTtBuP in various solvents. For example, the lifetime in 2-methyltetrahydrofuran increases from 51 picoseconds at 295° K. to 5.8 microseconds at 85° K. A similar temperature dependence is found in dimethylformamide. Collectively, data obtained show that the lifetimes of the ligand-field excited state of NiTtBuP in both nonpolar and polar solvent increase in a controllable manner by three orders of magnitude when the temperature is reduced from room temperature to approximately 80° K. and that the temperature dependence of the expected lifetimes of the porphyrin derivatives of the present invention are consistent with the Arrhenius exponential relationship.

The invention being thus described, it will be apparent that the same may be varied in many ways. Such variations are not to be regarded as a departure from the spirit and scope of the invention, and all such modifications as would be obvious to one skilled in the art are intended to be included within the scope of the following claims.

We claim:

1. A halogenated nickel-porphyrin in a matrix, said halogenated nickel-porphyrin comprising at least two conformational isomers, a lower-energy-state conformer and a higher-energy-state conformer, such that when the higher-energy-state conformer is generated from the lower-energy-state conformer following absorption of a photon of suitable energy, the time to return to the lower-energy-state conformer is greater than 40 nanoseconds at approximately room temperature.

2. The nickel-porphyrin derivative of claim 1 wherein the halogenated nickel porphyrin is nickel(II) dichloro-sextabromo tetra(tert-butyl) porphyrin.

3. The nickel-porphyrin derivative of claim 1 wherein the halogenated nickel porphyrin is nickel(II) octabromo tetra (trifluoromethyl) porphyrin.

4. The halogenated nickel-porphyrin of claim 1, wherein the matrix is a solvent.

5. The halogenated nickel-porphyrin of claim 4 wherein the solvent is selected from the group consisting of benzene, toluene, methylcyclohexane, cyclohexane, mineral oil, 2,2,5,5-tetramethyltetrahydrofuran, o-dichlorobenzene, 2,6-dimethylpyridine, chlorobenzene, quinoline, nitrobenzene, 2-nitrotoluene, benzonitrile, dimethylformamide, dimethylsulfoxide, nitromethane, 2-methylpyridine, 2,5-dimethylpyrrolidine, piperidine, aniline, pyridine, pyrrolidine, 2,5-dimethyltetrahydrofuran, methyl(t-butyl) ether, anisole, 3-pentanone, 2-methyltetrahydrofuran, cyclohexanone, tetrahydrofuran, diethylether, 3-methylpentane, methylcyclopentane, and 1,4-dioxane.

6. The halogenated nickel-porphyrin of claim 1 wherein the matrix is a polymer.

7. The halogenated nickel-porphyrin of claim 6 wherein the polymer is polystyrene.

8. The halogenated nickel-porphyrin of claim 1 wherein the matrix is a gel.

* * * * *